(12) United States Patent
Bevan

(10) Patent No.: US 7,731,814 B2
(45) Date of Patent: Jun. 8, 2010

(54) FORMATION OF LEATHER SHEET MATERIAL USING HYDROENTANGLEMENT

(75) Inventor: Christopher Graham Bevan, Lincolnshire (GB)

(73) Assignee: E-Leather Limited, Stamford, Lincolnshire (GB)

( * ) Notice: Subject to any disclaimer, the term of this patent is extended or adjusted under 35 U.S.C. 154(b) by 43 days.

(21) Appl. No.: 11/628,393

(22) PCT Filed: May 27, 2005

(86) PCT No.: PCT/GB2005/002136

§ 371 (c)(1),
(2), (4) Date: Aug. 9, 2007

(87) PCT Pub. No.: WO2005/118932

PCT Pub. Date: Dec. 15, 2005

(65) Prior Publication Data

US 2008/0010794 A1    Jan. 17, 2008

(30) Foreign Application Priority Data

Jun. 3, 2004    (GB) ................................. 0412380.8

(51) Int. Cl.
*D04H 1/00*    (2006.01)
(52) U.S. Cl. ........................... 156/148; 28/103; 28/104; 28/140; 428/151; 428/152; 428/85; 264/500; 264/319

(58) Field of Classification Search .................. 28/104, 28/103, 140; 428/152, 151, 85; 264/500, 264/319; 156/148
See application file for complete search history.

(56) References Cited

U.S. PATENT DOCUMENTS

| | | | | |
|---|---|---|---|---|
| 3,692,622 A | * | 9/1972 | Dunning | 428/171 |
| 4,442,161 A | * | 4/1984 | Kirayoglu et al. | 428/219 |
| 5,009,747 A | * | 4/1991 | Viazmensky et al. | 162/115 |
| 5,254,399 A | * | 10/1993 | Oku et al. | 442/351 |
| 6,007,653 A | * | 12/1999 | Pirinen et al. | 156/148 |
| 6,264,879 B1 | | 7/2001 | Addie et al. | |
| 2003/0207636 A1 | * | 11/2003 | Gosavi et al. | 442/327 |

FOREIGN PATENT DOCUMENTS

| | | |
|---|---|---|
| WO | WO01/94673 | 12/2001 |
| WO | WO03/048437 | 6/2003 |

\* cited by examiner

*Primary Examiner*—Jeff Aftergut
*Assistant Examiner*—Jaeyun Lee
(74) *Attorney, Agent, or Firm*—Koppel, Patrick, Heybl & Dawson; Michael J. Ram

(57) ABSTRACT

Leather sheet material is made by hydroentangling a web (4) of mixed reclaimed leather fibers and synthetic fibers. The synthetic fibers are meltable bicomponent fibers which are heated prior to entanglement to fuse and form a supporting network for the leather fibers. A sheet of tissue paper (1a) is laid over the surface of the leather fiber web (4) and hydroentanglement jets (16) are directed through the tissue paper into the web.

10 Claims, 1 Drawing Sheet

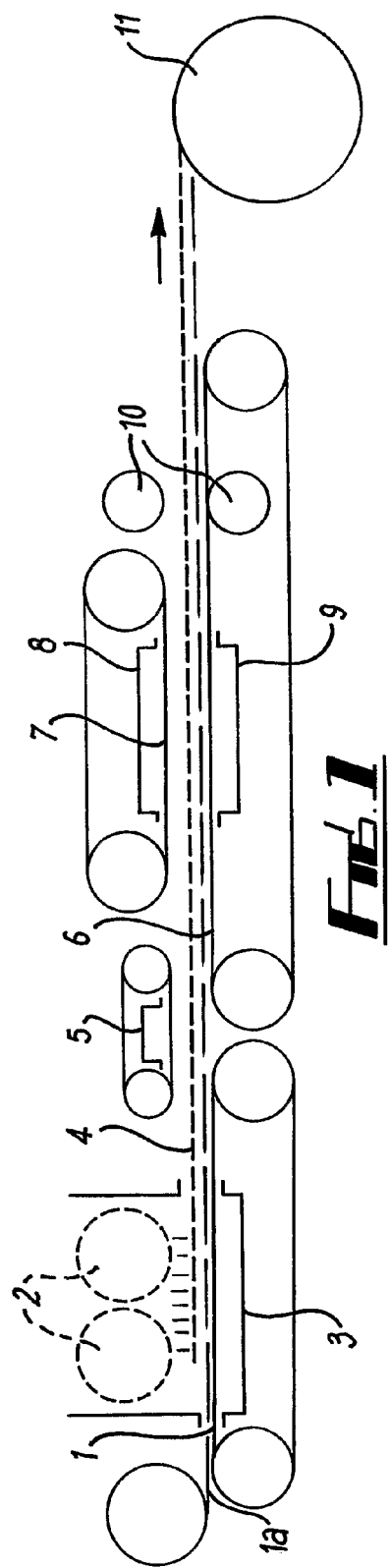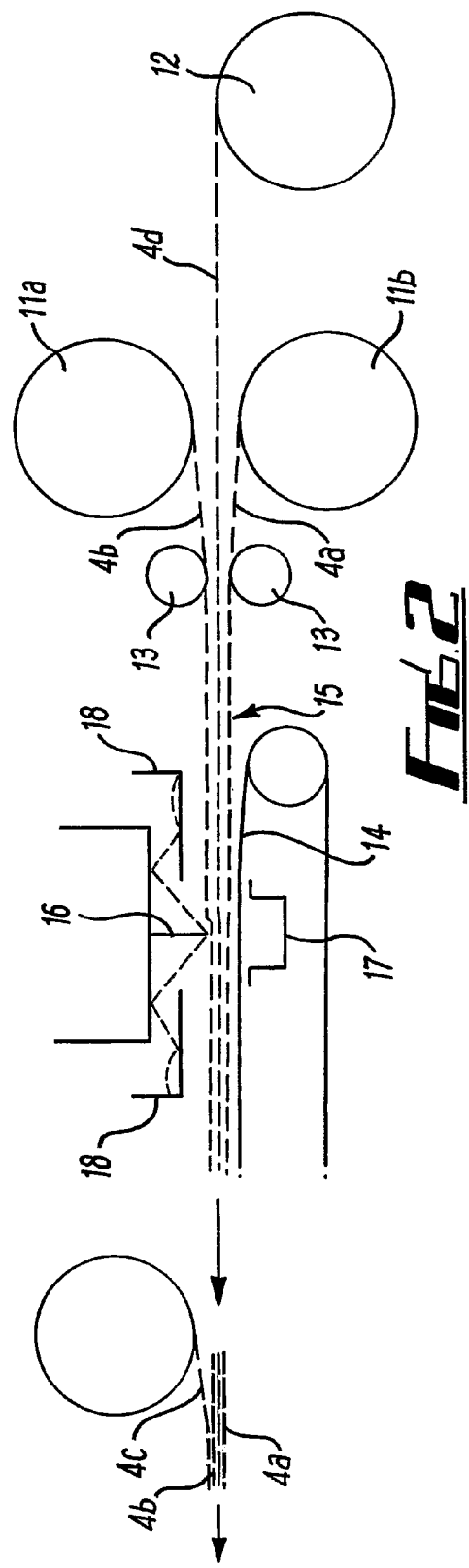

US 7,731,814 B2

FORMATION OF LEATHER SHEET MATERIAL USING HYDROENTANGLEMENT

This is a National Stage Application of PCT/GB2005/002136 filed May 27, 2005, published as WO2005/118932, and claiming priority from British application 0412380.8 filed Jun. 3, 2004.

This invention relates to the formation of sheet material from leather fibres particularly using a process known as hydroentanglement or spunlacing.

Prior patent application WO 01/94673 (PCT/GB 01/02451) describes the use of hydroentanglement (or spunlacing) to produce a high quality reconstituted leather sheet material from waste leather fibres. Hydroentangling jets are directed at high pressure through specialised screens into a web of leather fibres. The screens facilitate deep penetration of the jets which otherwise would not occur to the same extent due to the tendency of leather fibres to entangle readily at the surface of the web and thereby impede further entanglement.

Leather fibres derived from disintegration of waste leather are substantially shorter and finer than fibres normally used in hydroentanglement processes and even with the constraining action of the screens there is the problem of preventing the fibres being washed away by the jets.

To that end, prior application WO 03/048437 (PCT/GB 02/05381) proposes the use of man made bicomponent fibres having outer layers with a lower melting point then inner cores. These bicomponent fibres are mixed with base leather fibres to form a web and this is then heated to cause the bicomponent fibres to fuse together at intersections to form a network within the web.

This network holds the fine, short leather fibres from being displaced during hydroentanglement so that jets at high pressure can penetrate deeply into the body of fibres and thereby entangle the relatively thick layers required for leather products.

By using a network of bicomponent fibres it is feasible to use high pressure jets to achieve deep entanglement. This contrasts with conventional hydroentanglement procedures in which low jet pressures are used initially to avoid disrupting fibres. Such conventional procedures would not be appropriate for use with leather fibres because leather fibres hydroentangle unusually readily and conventional procedures would form a fully entangled layer on the surface that impedes entanglement of the interior fibres.

However, one problem with the use of an internal network of bonded fibres is that this can compromise the otherwise leather-like handle of the finished product.

If the network is sufficiently insubstantial to have no noticeable effect on handle, the high pressure jets tend to erode the leather fibres, particularly if they are short in length. While relatively long leather fibres can be produced using methods described in WO 01/94673 (PCT/GB 01/02451), the even laying of such fibres needed prior to hydroentangling can be slow to produce using conventional air laying equipment. Erosion of fibres during the initial application of high pressure jets can be prevented by using a screen on the surface of the fibres as described in WO 01/94673 (PCT/GB 01/02451) but this can waste hydroentangling energy due to the significant proportion of water hitting the solid parts of the screen.

Another problem when minimising the influence of the bicomponent fibre network on the finished product is that such networks can be structurally weak and the resulting web of leather and bicomponent fibres may be difficult to unwind securely from reels under production conditions to feed the hydroentangling process.

One object of the present invention is to provide a method of forming leather sheet material by entanglement of leather fibres with which deep entanglement can be satisfactorily achieved without undue loss of entangling energy or using internal networks that unduly compromise end product performance.

A further object is to enable strengthened leather fibre webs to be formed particularly so they can be securely handled and unwound from reels to feed the hydroentangling process even in the case of thin webs.

According to the invention therefore there is provided a method of forming sheet material form a mixture of fibres comprising mainly leather base fibres and additional synthetic fibres, said synthetic fibres having outer meltable layers, comprising the steps of:

forming the fibres into a web;

heating to melt the outer layers of the additional synthetic fibres so as to cause such fibres to fuse together at intersections to form a network within the web, subjecting the web to hydroentanglement to entangle the base fibres while constrained by the network;

characterized in that tissue material is applied to at least one face of the web prior to said entanglement thereof from said face.

With this arrangement, the tissue can act as an external screen to constrain the leather fibres against erosion during entanglement. Accordingly good entanglement can be achieved with only a minimal network within the web even where the leather fibres are relatively short, fine fibres liable to erosion during entanglement. Moreover, the tissue can be relatively insubstantial so that it does not provide a significant shielding action such as to give rise to significant waste of energy during entanglement as is the case with screens as mentioned above. External screens, other than the tissue can therefore be wholly omitted although if desired they may be used additionally to a limited or reduced extent or for different purposes such as masking surface lines caused by hydroentanglement jets.

By tissue material is particularly meant a thin, fine porous sheet material which has sufficient strength to be machine handleable without ready disintegration e.g. using feed rollers or the like and can retain its structural integrity when laid on the fibre web to give a restraining or holding effect on such web even in moist conditions, but is of relatively low weight so that e.g. it can be air-laid using conventional air-laying techniques, and which has a relatively open or openable porous weak structural composition so as not to present any significant resistance to penetration locally therethrough of conventional hydroentanglement water jets with sufficient energy to hydroentangle leather fibres therebeneath and preferably such as to disintegrate substantially wholly when subjected to the entanglement procedure particularly under impact of the conventional hydroentanglement water jets.

More particularly the tissue material may be tissue paper, especially made from wood pulp fibres, although other natural and/or synthetic fibres are also possible (alternatively or additionally to wood pulp fibres), and which typically is nonwoven and has a weight of less than 40 g/m² especially less than 30 g/m². More particularly tissue paper of the kind having a weight of less than 25 or 21 g/m² especially in the range 15-25 or 17-21 g/m². Preferably also the tissue paper is of the kind having 'wet strength'. In this respect, in the case of tissue paper made wholly from nonwoven wood pulp fibres, the fibres are held together by hydrogen bonds whereby in moist conditions the bonds are disrupted and the paper disintegrates. In the case of tissue paper having 'wet strength' a small proportion of an additive is incorporated to provide inter-fibre bonding which is not readily disintegrated by water. By way of example a polymeric material, such as a polyaminoamide (a polyamide epichlorohydrin resin PAE), is commonly incorporated at a low level. Such polymeric material has been found to agglomerate at fibre intersections and produce covalent fibre to fibre bonds. Such bonds contribute to the strength of the tissue rather than providing all or most of the strength.

The tissue is preferably applied to the web face before the heating step so that the additional meltable or bicomponent fibres bond to the tissue and thereby prevent the latter from being displaced during hydroentanglement. Furthermore such bonding can assist in strengthening the web prior to hydroentangling so that reels can be securely handled during storage and production.

Fine jets of water at high pressure may be applied to the face of the composite web covered with the tissue, the jets having sufficient energy to penetrate the tissue and hydroentangle the leather fibres beneath.

After hydroentangling, the tissue in the direct path of the jets may be broken through but will remain intact elsewhere until subjected to further hydroentanglement where the jets impinge along different lines. During these procedures the tissue becomes saturated and, particularly with tissues made from wood pulp, can be considerably weakened. However by this time hydroentanglement of the leather fibres will have advanced to the stage where the protective function of the tissue is no longer needed, and the fibres comprising the tissue material are dispersed into the matrix of base fibres and become an integral part of the finished product. Because the tissue is thin and the fibres comprising it are a small proportion of the composite web, the tissue fibres are not noticeable in the final product. Unlike the metal screens described in WO 01/94673 (PCT/GB 01/02451), the tissue "screen" does not significantly shield the jets from the leather fibres and practically all the hydroentangling energy is available for consolidating the web.

The entanglement of the method of the invention is preferably performed using high pressure jets of liquid (particularly water) preferably in multiple passes. Reference is made to WO 01/94673 (PCT/GB 01/02451) for further details of such features.

The additional synthetic fibres may be man made bicomponent fibres, and the web may be advanced through a heating means that melts the outer layers of the bicomponent fibres so they fuse at their intersections, and form a three dimensional network throughout the web. Reference is made to WO 03/048437 (PCT/GB 02/05381) for further details of such features.

The web may incorporate one or more fabric reinforcements as described in WO 01/94673 (PCT/GB 01/02451) and WO 03/048437 (PCT/GB 02/05381). The fabric reinforcement may be midway within the web whereby the hydroentangling jets needed only to reach a bit more than halfway through the thickness to drive the fibres into the interstices of the fabric. However with some product applications it may be preferable to locate the reinforcing fabric nearer to one face, which results in the opposite face being thicker and the jets having further to penetrate. In such cases (and for thick products in general) the distance the jets have to penetrate can be reduced by hydroentangling a relatively thin composite layer onto a core fabric, then hydroentangling another layer(s) onto the previously consolidated layer. In each case the jets are applied to the face covered with tissue, which becomes sufficiently dislocated by the jets so that fibres from the succeeding layer can be driven by subsequent hydroentangling into the preceding layer. This multiple layering procedure can increase the upper limit of overall thickness that can be hydroentangled by around 25%, compared to previous methods that would require multiple application of surface screens.

A variety of tissues can be used, and their suitability for the process can be determined by conducting hydroentangling trials. Particularly to reduce costs the tissue may be mass produced, lightweight paper tissue. Such material, with the right balance of wet strength and ease of penetration by hydroentanglement jets, is commonly used for lining diapers or napkins. The tissue should also be sufficiently porous not to impede air and water flow through porous carrier belts of air laying or hydroentangling plants. Wet strength should be sufficient to ensure the tissue does not disintegrate before the underlying leather fibres have had a chance to hydroentangle satisfactorily, but wet strength should not be sufficient to prevent the hydroentangling jets from penetrating through the tissue to reach the leather fibres beneath. A satisfactory combination of such properties occurs with open grade diaper tissue at 18 g/m$^2$ with a porosity of 2000 I/m$^2$/s and a wet tensile strength of around 30 N/m.

Dry strengths of such pulp based tissues can normally be much greater than their wet strengths, and the resulting webs can usually have more than adequate strength for secure in-process handling prior to hydroentangling.

It is technically feasible to use stronger, heavier tissues, but these cost more and leave more non-leather fibres in the final product. There is some latitude to use lighter tissues but generally 18 g/m$^2$ is towards the limit of suitable tissues that are commercially available. It is also feasible to use tissues made from fibres other than wood pulp, but these are significantly more expensive, and usually the fibre length presents more obstruction to penetration by the jets.

A variety of bicomponent fibres can be used as the additional synthetic fibres and these may constitute a minor proportion of the weight of the leather fibres, say as low as 4%.

Bicomponent fibres which are particularly economical and have good compatibility with leather-like handle are 4 mm or 6 mm, 1.7 dtex polypropylene with a low melt polyethylene outer layer. Such fibres are commonly used for binding air laid products, although not at the very low preferred dosage of up to around 4% of leather fibre weight. It is possible to reduce the dosage below 4%, the limiting factors being the accuracy of metering equipment, the evenness of dispersion throughout the leather fibre, and bonding to the tissue sufficiently to anchor the latter to the body of fibres. Such anchorage is desirable to prevent the tissue from being scoured away from the leather fibres before latter have become sufficiently well entangled to withstand any subsequent passes through hydroentanglement jets. More than 4% bicomponent fibre can be used (for example 20% or more) but this can compromise the leather-like feel of the final product. As indicated in WO 03/048437 (PCT/GB 02/05381), higher bicomponent content helps to resist surface cracking of the final product, and balance desirably should be struck between this and handle.

Other fibres may be incorporated additional to leather and bicomponent fibres, for reinforcement. Such reinforcement may be needed when very short leather fibres are used (as, for example, produced by hammer milling), and suitable man-made reinforcing fibres can be those designed for enhancing the strength of paper and wood pulp products (e.g. 6 mm 1.7 dtex crimped Tencel fibres). Dose rates of reinforcing fibres can vary widely depending on the requirements of the finished product, and for shoe applications using short leather fibres, surface cracking initiated by jet grooves can be prevented by around 20% additions relative to the weight of leather fibre. Dosage rates at this level would normally only be needed for the layer of fibres encompassing the finish surface of the final product, and layers remote from the finish surface may have a lower or nil dosage of reinforcing fibres. Internal reinforcing fabrics, may also be used as mentioned above.

As mentioned above a number of composite webs may be consolidated by multi-layering depending on the requirements of the end product, particularly its overall weight and thickness. Typically, the total input of dry fibres and tissue may be around 530 g/m2, but this can (for example) be increased to over 600 g/m2. For these heavier substrates, good consolidation can be achieved by adding a third web after consolidating first and second webs, then hydroentangling the third web so it consolidates and coalesces with the second web. In such a case the weights of the webs will generally be adjusted to be the same, but this is not essential. Depending on end product requirements and product thickness, the layers can be two or more on either or both sides of a reinforcing fabric. Alternatively, only one web can be on one side or one web on each side of such a fabric and total web weight may be 300 g/m$^2$ or less. Also, multi-layering can be used without including any reinforcing fabric.

With regard to hydroentangling sequences and jet parameters, such as pressures, diameters and jet spacing, these depend on the requirements of the end product and can be established by trial and error testing. As a general guide, for maximum consolidation high pressures of 200 bar or more may be used, although for thin webs (particularly on the side that subsequently provides the finished surface of the final product) pressures may be reduced to reduce deep furrows from the jets as mentioned above. Alternatively furrows can be avoided by applying a surface screen of the type described in WO 01/94673 during the finishing pass or passes. This breaks up the lines into discrete indents rather than continuous furrows, and are consequently less noticeable. The degree of consolidation also depends on the thickness of the web layers and the speed at which the layers are passed under the jets. For thicker constructions slower speeds (for example 5m/min) may be used and thinner constructions can generally be consolidated at higher speeds (for example 10 to 16 m/min or more).

Equipment to effect hydroentanglement may include horizontal carrier belts for conveying the web or webs past jet heads. However, as described in WO 01/94673 (PCT/GB 01/02451), jet heads can be mounted at various angles around porous drums, giving a more compact arrangement. In this case the layout can be significantly simplified using the method of the present invention as this can dispense with external screens. As described in WO 01/94673 (PCT/GB 01/02451) and WO 03/048437 (PCT/GB 02/05381) it is generally desirable to collect the water from the jets that rebounds from the surface of the webs using collecting trays. It is also generally desirable to use sufficient vacuum extraction beneath the carrier belt to pull at least some of the water from the jets through the webs. The fine nature of leather fibres impedes flow of water, and such vacuums may need to be 600 mbar, which is much higher than used in conventional practice.

The invention will now be described further by way of example only and with reference to the accompanying drawings in which:

FIG. 1 is a schematic view of initial stages of one form of apparatus used in the performance of the method of the invention and which shows the main operating principles of a commercial plant for making a fibre web with a fused bicomponent network; and FIG. 2 shows further stages of the apparatus for combining such web with reinforcing fabric and hydroentangling the resulting sandwich.

Referring to FIG. 1, waste leather fibres are mixed with 4% of 1.7 dtex bicomponent fibres and 5% of 3.0 dtex standard polyester fibres both cut to constant 6 mm length.

A continuous length of porous paper tissue 1*a* of weight 18 g/m$^2$ with a porosity of approximately 2000 I/m$^2$/s is laid onto a driven porous belt 1. The fibre mixture is evenly distributed at around, 200 g/m$^2$ onto the tissue 1*a* on the driven porous belt 1 by at least one pair of perforated drums 2 while the fibres are drawn onto the tissue 1*a* by vacuum box 3 beneath the belt 1.

The resulting web 4 of evenly laid fibres with the tissue 1*a* is transferred by a conventional vacuum conveyor 5 to porous belts 6 and 7, which contain and partially compress the web while hot air from a box 8 is blown through belts 7 and 6 and web 4, and received by a suction box 9. The temperature of the hot air is sufficient to melt the outer sheath of the bicomponent fibres (but not the inner core) and thereby fuse the fibres together at their intersections.

Before the melted sheaths at the intersections of the bicomponent fibres fully solidify, the web may be compressed by nip rollers 10 to form a denser web consisting of un-bonded leather and polyester fibres supported by a three-dimensional network of fused bicomponent fibres. On solidification of the intersections the network provides sufficient strength for the web to be wound onto reel 11 for transport and/or storage. All these steps are carried out using commercially available equipment for making air laid pulp products like diapers.

Three such webs 4*a*, 4*b*, 4*c* are formed differing in their unit weight, that is the weight of one web 4*a* is 150 gm/m$^2$ whereas the weight of the other webs 4*b*, 4*c*, achieved by addition of a greater quantity of fibres, is 190 g/m$^2$.

Referring to FIG. 2, two such webs 4*a* and 4*b* unwind from reels 11*a* and 11*b* together with fabric reinforcement 4*d* from reel 12, and are brought together by rollers 13 to feed onto a porous belt 14. Webs 4*a*, 4*b* with fabric 4*d* therebetween comprise a composite sandwich 15 which is conveyed by belt 14 through hydroentangling jets 16, and water from the jets is drawn through the sandwich 15 and porous belt 14 by vacuum box 17. Water rebounding from the surface of the composite sandwich is collected in trays 18 and conveyed away as described more fully in WO 01/94673 (PCT/GB 01/02451).

The resulting consolidated web structure is passed through a plurality of successive hydroentanglement stages, on the same porous belt 14 and subsequently on further belts so that jets can be applied to both surfaces of the web structure. At one such further belt, the third web 4*c* is unwound and layed with tissue face uppermost onto the hydroentangled surface of web 4*b* opposite to the face-forming web 4*a*. The resulting multiple layers are then passed through a further plurality of hydroentangling stages so that web 4*b* is firmly attached to web 4*a*.

In more detail, the hydroentanglement procedure is applied as follows to consolidate the three webs 4*a*, 4*b*, 4*c* and the fabric 4*d*:

Primary consolidation: Web 4*a*, reinforcing fabric 4*d* and web 4*b* are fed from reels onto the porous carrier belt running at 8 m/min, with the tissue on web 4*b* uppermost, the tissue on web 4*a* in contact with the belt, and fabric 4*d* sandwiched between 4*a* and 4*b*. The three layers are passed under the first jet head containing 130 micron diameter hydroentangling jets at 0.7 mm centres and 200 bar pressure. Consolidation is further enhanced by repeating the procedure under a second jet head. These procedures hydroentangle the fibres in web 4*b* to near to their final level and sufficiently for fibres from web 4b to penetrate into the interstices of the fabric 4d and to link with fibres in web 4a, and thereby firmly attach the layers to the fabric to form a consolidated primary multiple web structure.

Finish face consolidation: The resulting primary web structure is led to a second porous carrier belt and passed under a third jet head with the tissue on web 4a uppermost and jet diameter and spacing as for the previous heads. Jet pressure is lower at 120 bar, due to the lighter weight of web 4a compared to 4b and the need to limit the depth of groove formed by the jet, which can otherwise adversely affect the finished appearance of the product. The primary web structure is passed under two more jet heads at progressively lower pressures of 80 and 50 bar in order to blur the peaks and troughs of the jet lines caused by the preceding jets and to further improve the surface finish of the final product.

Additional web and final consolidation: The fully consolidated primary multiple web structure is led onto a third carrier belt with the tissue face of web 4b uppermost, and web 4c is unwound onto the surface of web 4b with the tissue face of 4c uppermost. Web 4c and the primary web structure are passed under a further jet head with the same jet type and high pressure as the first jet head, and the procedure is repeated at a yet further jet head. To provide a less lined finish on the back face of the finished product, the fully consolidated substrate may then be passed under two further jet heads at much lower pressure as described for the finish face 4a. As with the finish face, these lower jet pressures confer little in-depth consolidation, and their purpose is primarily to improve surface appearance and reduce the possibility of jet grooves causing surface cracks in the final product.

For products that require a finished face that is completely free of jet grooves, a perforated screen as described in WO 01/94673 (PCT/GB 01/02451) may be interposed between the jets and the surface of web 4a. This can convert the linear jet grooves into a multiplicity of isolated indents, which are generally much less noticeable in the finished product. In such cases it is usually desirable to increase the pressure of the jets from 120 bar as described previously to 200 bar in order to compensate for the loss of hydroentangling energy due to the obstruction of the screen.

After hydroentangling the fully consolidated web structure may be impregnated with oil emulsions, pigments and polymers to improve the handle and durability of the final product. These treatments broadly follow conventional leather-making practice, and are followed by drying, buffing both faces and surface coating to provide a leather-like final finish.

As described the process results in a material suitable for shoe manufacture. The invention is not limited to this and the process may be used to form leather materials for other applications.

It is of course to be understood that the invention is not intended to be restricted to the above embodiment which is described by way of example only.

The invention claimed is:

1. A method of forming sheet material from a mixture of fibres comprising mainly leather base fibres and additional synthetic fibres, said synthetic fibres having outer meltable layers, comprising the steps of: providing a porous tissue web material forming the fibres into a web; with said porous tissue web material comprising a face thereon heating to melt the outer layers of the additional synthetic fibres so as to cause such fibres to fuse together at intersections to form a network within the web, and to bond the additional synthetic fibres to the tissue material to form a laminate with a tissue web face subjecting the laminate with tissue web face to hydroentanglement applied to the tissue web face to entangle the base fibres while constrained by the network;

the tissue web material disintegrating substantially wholly when subjected to said hydroentanglement.

2. A method according to claim 1 characterised in that the hydroentanglement is performed using high pressure water jets.

3. A method according to claim 2 characterised in that multiple passes past said jets are used.

4. A method according to claim 1 characterised in that the additional synthetic fibres are bicomponent fibres.

5. A method according to claim 1 characterised in that the web incorporates a fabric reinforcement.

6. A method according to claim 1 characterised in that the tissue material is a wood pulp derived tissue paper.

7. A method according to claim 6 characterised in that the tissue paper has a weight of 15-25 g/m$^2$.

8. A method according to claim 7 characterised in that the tissue paper is an open grade diaper tissue of 18 g/m$^2$ with a porosity of 2000 l/m$^2$/s and a wet tensile strength of 30N/m.

9. A method according to claim 1 characterised in that the additional synthetic fibres constitute up to 4% of the leather fibres weight.

10. A method according to claim 3 characterised in that in a finishing pass or passes at least one screen is interposed between the jets and the web.

* * * * *